United States Patent
Orrell et al.

(10) Patent No.: US 7,170,854 B1
(45) Date of Patent: Jan. 30, 2007

(54) SYSTEM AND METHOD USING SWITCH FABRIC TO SUPPORT REDUNDANT NETWORK PORTS

(75) Inventors: Jason P. Orrell, Cedar Park, TX (US); Cuong T. Nguyen, Austin, TX (US); Anthony H. Anconetani, Round Rock, TX (US)

(73) Assignee: GenBand Inc., Austin, TX (US)

( * ) Notice: Subject to any disclaimer, the term of this patent is extended or adjusted under 35 U.S.C. 154(b) by 941 days.

(21) Appl. No.: 09/969,324

(22) Filed: Oct. 2, 2001

(51) Int. Cl.
*G06F 11/16* (2006.01)

(52) U.S. Cl. ..................... 370/228; 370/218

(58) Field of Classification Search ............... 370/216, 370/217, 218, 220, 221, 225, 228
See application file for complete search history.

(56) References Cited

U.S. PATENT DOCUMENTS

| | | | |
|---|---|---|---|
| 4,381,427 A | 4/1983 | Cheal et al. | 179/2 DP |
| 4,493,092 A | 1/1985 | Adams | 375/36 |
| 4,504,942 A | 3/1985 | Aro et al. | 370/58 |
| 4,507,793 A | 3/1985 | Adams | 375/36 |
| 4,512,025 A | 4/1985 | Frankel et al. | 375/36 |
| 4,578,537 A | 3/1986 | Faggin et al. | 179/2 DP |
| 4,608,686 A | 8/1986 | Barsellotti | 370/69.1 |
| 4,627,046 A | 12/1986 | Bellamy | 370/58 |
| 4,740,963 A | 4/1988 | Eckley | 370/110.1 |
| 4,748,656 A | 5/1988 | Gibbs et al. | 379/93 |
| 4,757,497 A | 7/1988 | Bierele et al. | 370/89 |
| 4,843,606 A | 6/1989 | Bux et al. | 370/89 |
| 4,853,949 A | 8/1989 | Schorr et al. | 379/2 |
| 4,881,226 A | 11/1989 | Lechner et al. | 370/110.1 |
| 4,903,292 A | 2/1990 | Dillon | 379/93 |

(Continued)

FOREIGN PATENT DOCUMENTS

EP 0 841 831 A2 5/1998

(Continued)

OTHER PUBLICATIONS

Robert E. Larson, "Method for Implementing IP on ATM Networks," at Internet address <http://www.odyssea.com/whats_new/ipoveratm/atm.html>. Dated Dec. 1, 1995. pp. 1-8.

(Continued)

*Primary Examiner*—Hassan Kizou
*Assistant Examiner*—Anthony Sol
(74) *Attorney, Agent, or Firm*—Baker Botts L.L.P.

(57) ABSTRACT

In a method for providing protection switching in a voice-over-broadband (VOB) gateway, egress traffic is multicast from a switch fabric to a working port and to a protection port. The working port forwards the egress traffic to a network in a working mode of operation, and the protection port forwards the egress traffic to the network in a protection mode of operation. Also, the working port forwards ingress traffic to the switch fabric in the working mode of operation, and the protection port forwards the ingress traffic to the switch fabric in the protection mode of operation. In one aspect, ingress traffic is forwarded from the protection port and not from the working port in the protection mode of operation. In another aspect, the working port and the protection port share status information, and the status information is used to select between the working mode of operation and the protection mode of operation.

14 Claims, 2 Drawing Sheets

U.S. PATENT DOCUMENTS

| | | | |
|---|---|---|---|
| 5,033,062 A | 7/1991 | Morrow et al. | 375/7 |
| 5,034,948 A | 7/1991 | Mizutani et al. | 370/79 |
| 5,127,003 A | 6/1992 | Doll, Jr. et al. | 370/110.1 |
| 5,134,611 A | 7/1992 | Steinka et al. | 370/79 |
| 5,142,568 A | 8/1992 | Ogata et al. | 370/110.1 |
| 5,142,571 A | 8/1992 | Suzuki et al. | 370/79 |
| 5,151,923 A | 9/1992 | Fujuwara | 375/5 |
| 5,216,704 A | 6/1993 | Williams et al. | 379/93 |
| 5,220,560 A | 6/1993 | Ogasawara | 370/79 |
| 5,247,347 A | 9/1993 | Litteral et al. | 358/85 |
| 5,267,300 A | 11/1993 | Kao et al. | 379/93 |
| 5,305,312 A | 4/1994 | Fornek et al. | 370/62 |
| 5,317,627 A | 5/1994 | Richardson, Jr. et al. | 379/93 |
| 5,341,374 A | 8/1994 | Lewen et al. | 370/85.4 |
| 5,349,640 A | 9/1994 | Dunn et al. | 379/387 |
| 5,367,522 A | 11/1994 | Otani | 370/84 |
| 5,410,343 A | 4/1995 | Coddington et al. | 348/7 |
| 5,426,692 A | 6/1995 | Fujise | 379/93 |
| 5,448,635 A | 9/1995 | Biehl et al. | 379/399 |
| 5,473,675 A | 12/1995 | Chapman et al. | 379/93 |
| 5,479,447 A | 12/1995 | Chow et al. | 375/260 |
| 5,493,609 A | 2/1996 | Winseck, Jr. et al. | 379/96 |
| 5,499,241 A | 3/1996 | Thompson et al. | 370/73 |
| 5,604,737 A | 2/1997 | Iwami et al. | 370/352 |
| 5,606,553 A | 2/1997 | Christie et al. | 370/394 |
| 5,610,910 A | 3/1997 | Focsaneanu et al. | 370/351 |
| 5,610,922 A | 3/1997 | Balatoni | 370/468 |
| 5,617,423 A | 4/1997 | Li et al. | 370/426 |
| 5,625,404 A | 4/1997 | Grady et al. | 348/7 |
| 5,625,685 A | 4/1997 | Allegranza et al. | 379/399 |
| 5,638,363 A | 6/1997 | Gittins et al. | 370/358 |
| 5,661,785 A | 8/1997 | Carpenter et al. | 379/93.15 |
| 5,668,857 A | 9/1997 | McHale | 379/93.07 |
| 5,671,251 A | 9/1997 | Blackwell et al. | 375/222 |
| 5,673,290 A | 9/1997 | Cioffi | 375/260 |
| 5,675,575 A | 10/1997 | Wall, Jr. et al. | 370/326 |
| 5,692,035 A | 11/1997 | O'Mahony et al. | 379/93 |
| 5,719,870 A | 2/1998 | Baker et al. | 370/463 |
| 5,737,333 A | 4/1998 | Civaniar et al. | 370/352 |
| 5,771,236 A | 6/1998 | Sansom et al. | 370/458 |
| 5,781,547 A | 7/1998 | Wilson | 370/395 |
| 5,781,617 A | 7/1998 | McHale et al. | 379/93.14 |
| 5,787,088 A | 7/1998 | Dagdeviren et al. | 370/493 |
| 5,793,843 A | 8/1998 | Morris | 379/59 |
| 5,828,666 A | 10/1998 | Focsaneanu et al. | 370/389 |
| 5,838,682 A | 11/1998 | Dekelbaum et al. | 370/401 |
| 5,841,840 A | 11/1998 | Smith et al. | 379/93.01 |
| 5,848,150 A | 12/1998 | Bingel | 379/399 |
| 5,862,134 A | 1/1999 | Deng | 370/352 |
| 5,864,747 A | 1/1999 | Clark et al. | 455/3.2 |
| 5,878,120 A | 3/1999 | O'Mahony | 379/93.09 |
| 5,881,142 A | 3/1999 | Frankel et al. | 379/167 |
| 5,883,941 A | 3/1999 | Akers | 379/93.08 |
| 5,889,773 A | 3/1999 | Stevenson, III | 370/352 |
| 5,889,774 A | 3/1999 | Mirashrafi et al. | 370/352 |
| 5,889,856 A | 3/1999 | O'Toole et al. | 379/399 |
| 5,896,377 A | 4/1999 | Boot et al. | 370/352 |
| 5,898,761 A | 4/1999 | McHale et al. | 379/93.01 |
| 5,901,205 A | 5/1999 | Smith et al. | 379/93.01 |
| 5,905,781 A | 5/1999 | McHale et al. | 379/93.14 |
| 5,907,548 A | 5/1999 | Bernstein | 370/353 |
| 5,917,814 A | 6/1999 | Balatoni | 370/352 |
| 5,936,952 A | 8/1999 | Lecomte | 370/352 |
| 5,940,479 A | 8/1999 | Guy et al. | 379/93.01 |
| 5,943,404 A | 8/1999 | Sansom et al. | 379/93.06 |
| 5,949,763 A | 9/1999 | Lund | 370/261 |
| 5,959,972 A * | 9/1999 | Hamami | 370/228 |
| 5,974,043 A | 10/1999 | Solomon | 370/352 |
| 5,978,390 A | 11/1999 | Balatoni | 370/540 |
| 5,982,767 A | 11/1999 | McIntosh | 370/352 |
| 5,991,292 A | 11/1999 | Focsaneanu et al. | 370/352 |
| 5,999,565 A | 12/1999 | Locklear, Jr. et al. | 375/222 |
| 5,999,598 A | 12/1999 | Henrick et al. | 379/93.07 |
| 6,075,784 A | 6/2000 | Frankel et al. | 370/356 |
| 6,075,796 A | 6/2000 | Katseff et al. | 370/466 |
| 6,078,580 A | 6/2000 | Mandalia et al. | 370/352 |
| 6,081,517 A | 6/2000 | Liu et al. | 370/352 |
| 6,101,182 A | 8/2000 | Sistanizadeh et al. | 370/352 |
| 6,112,084 A | 8/2000 | Sicher et al. | 455/426 |
| 6,118,780 A | 9/2000 | Dunn et al. | 370/355 |
| 6,125,113 A | 9/2000 | Farris et al. | 370/389 |
| 6,125,117 A | 9/2000 | Martin et al. | 370/397 |
| 6,130,879 A | 10/2000 | Liu | 370/230 |
| 6,130,883 A | 10/2000 | Spear et al. | 370/328 |
| 6,134,235 A | 10/2000 | Goldman et al. | 370/352 |
| 6,141,339 A | 10/2000 | Kaplan et al. | 370/352 |
| 6,144,667 A | 11/2000 | Doshi et al. | 370/401 |
| 6,144,670 A | 11/2000 | Sponaugle et al. | 370/401 |
| 6,154,445 A | 11/2000 | Farris et al. | 370/237 |
| 6,157,637 A | 12/2000 | Galand et al. | 370/356 |
| 6,167,042 A | 12/2000 | Garland et al. | 370/354 |
| 6,175,562 B1 | 1/2001 | Cave | 370/352 |
| 6,175,854 B1 | 1/2001 | Bretscher | 709/201 |
| 6,181,694 B1 | 1/2001 | Pickett | 370/353 |
| 6,181,715 B1 | 1/2001 | Phillips et al. | 370/493 |
| 6,201,806 B1 | 3/2001 | Moffett | 370/356 |
| 6,208,639 B1 | 3/2001 | Murai | 370/356 |
| 6,222,829 B1 | 4/2001 | Karlsson et al. | 370/329 |
| 6,229,810 B1 | 5/2001 | Gerszberg et al. | 370/401 |
| 6,236,653 B1 | 5/2001 | Dalton et al. | 370/352 |
| 6,240,084 B1 | 5/2001 | Oran et al. | 370/352 |
| 6,240,085 B1 | 5/2001 | Iwami et al. | 370/352 |
| 6,243,377 B1 | 6/2001 | Phillips et al. | 370/354 |
| 6,243,398 B1 | 6/2001 | Kahane et al. | 370/522 |
| 6,259,708 B1 | 7/2001 | Cheng et al. | 370/493 |
| 6,262,979 B1 | 7/2001 | Anderson et al. | 370/267 |
| 6,359,858 B1 * | 3/2002 | Smith et al. | 370/217 |
| 6,512,762 B1 * | 1/2003 | Renucci et al. | 370/352 |
| 2002/0089925 A1 * | 7/2002 | Smith et al. | 370/216 |
| 2002/0089926 A1 * | 7/2002 | Kloth | 370/220 |

FOREIGN PATENT DOCUMENTS

| | | |
|---|---|---|
| GB | 2313979 A | 12/1997 |
| WO | WO 97/23078 | 6/1997 |
| WO | WO 97/37458 | 10/1997 |
| WO | WO 98/42104 | 9/1998 |
| WO | WO 99/49608 | 9/1999 |
| WO | WO 00/56050 | 9/2000 |
| WO | WO 00/69131 | 11/2000 |
| WO | WO 01/05130 A1 | 1/2001 |
| WO | WO 01/06720 A1 | 1/2001 |
| WO | WO 01/13593 A1 | 2/2001 |
| WO | WO 01/13618 A1 | 2/2001 |

OTHER PUBLICATIONS

PMC-Sierra, Inc., "APS Operation on PM5357 S/UNI-622-POS," at Internet address <http://www.pmc-sierra.com/techSupport/kb/kbItem.asp?item=664> Printed Sep. 26, 2001. pp. 1-3.

PMC-Sierra, Inc., "APS: An Implementor's View," Presented by Jamie Meacham. Jul. 2000 pp. 1-25.

PMC-Sierra, Inc., "Saturn User Network Interface (622-POS) Reference Design," Preliminary Issue 2: Feb. 2000.

Bellcore, "Synchronous Optical Network (SONET) Transport Systems: Common Generic Criteria (A Module of TSGR, FR-440)," Issue 2, Dec. 1995 with Revision 2, Jan. 1999.

Gudapati, et al. "Local Telephone Service for Cable Subscribers Using Packet Switched Access," ISS. World Telecommunications Congress, pp. 325-329, Sep. 21, 1997.

L. Van Hauwermeiren, et al., "Offering Video Services over Twisted Pair Cables to the Residential Subscriber by Means of an ATM Based ADSL Transmission System," ISS Symposium, vol. 1, 5 pages, Apr. 1995.

T.C. Kwok, "Residential Broadband Architecture Over ADSL and G. Lite (G.992.2): PPP Over ATM," XP-000830885, IEEE Communication Magazine, 6 pages, May 1999.

Notification of Transmittal of the International Search Report or the Declaration, 6 pages, Feb. 5, 2001.

Notification of Transmittal of the International Search Report or the Declaration, 7 pages, Jun. 29 2001.

Notification of Transmittal of the International Search Report or the Declaration, 6 pages, Oct. 19, 2001.

Unknown, "Gateway control protocol," ITU-T Telecommunication Standardization Sector of ITU, Series H: Audiovisual and Multimedia Systems, Infrastructure of audiovisual services—Communication procedures, ITU-T Recommendation H.248, 224 pages, Jun. 2000.

Unknown, "Packet-based multimedia communications systems," ITU-T Telecommunication Standardization Sector of ITU, Series H: Audiovisual and Multimedia Systems, Infrastructure of audiovisual services—Systems and terminal equipment for audiovisual services, ITU-T Recommendation H.323, 124 pages, Feb. 1998.

Unknown, "Voice and Telephony Over ATM—ATM Trunking using AAL1 for Narrowband Services, Version 1.0," The ATM Forum Technical Commitee, AF-VTOA-0089.000, 64 pages, Jul. 1997.

Unknown, "Voice and Telephony Over ATM to the Desktop Specification," The ATM Forum Technical Commitee, af-vtoa-0083.000, 43 pages, May. 1997.

Unknown, "Call Signaling Protocols and Media Stream Packetization for Packet Based Multimedia Communications Systems," ITU-T Telecommunication Standardization Sector of ITU, Line Transmission of Non-Telephone Signals, ITU-T Recommendation H.225.0, Version 2, 141 pages, Mar. 25, 1997.

Unknown, "Visual telephone systems and equipment for local area networks which provide a non-guaranteed quality of service," ITU-T Telecommunication Standardization Sector of ITU, Series H: Audiovisual and Multimedia services—Systems and terminal equipment for audiovisual services, ITU-T Recommendation H.323, 79 pages, Nov. 1996.

Unknown, "Adaptation of H.320 visual telephone terminals to B-ISDN environments," ITU-T Telecommunication Standardization Sector of ITU, Series H: Transmission of Non-Telephone Signals, Infrastructure of audiovisual services—Systems and terminal equipment for audiovisual services, ITU-T Recommendation H.321, 20 pages, Mar. 1996.

J.M. Fossaceca, J.D. Sandoz, and P. Winterbottom, "The PathStar™ Access Server: Facilitating Carrier-Scale Packet Telephony," Bell Labs Technical Journal, 17 pages, Oct.-Dec. 1998.

F. Dawson, Contributing Editor, "Packet-Based Voice, Video Becoming Real Market, New software, codecs make integration of voice over data networks more feasible and affordable," http://www.zdnet.com/intweek/print/970303/inwk0006.html, 6 pages, ©1997, Aug. 7, 2001.

Unknown, "Telogy Networks' Voice over Packet White Paper," http://www.telogy.com/our_products/golden_gateway/VOPwhite.html, 14 pages, Aug. 7, 2001.

Unknown Author, "The Role of Voice-Data Integration in Transforming your Business to e-business," IBM Networking White Papers: Voice-Data Integration in e-business, http://www.networking.ibm.com/voice/voice-data.html, 23 pages, Aug. 7, 2001.

Unknown Author, Press Release, "VOCALTEC expands telephony gateway product line with new eight-line solution for corporate intranets and internet service providers," VocalTec—The First and the Best, http://www.vocaltec.com/html/news1996/press_11_25.html, 5 pages, Aug. 7, 2001.

Unknown Author, Press Release, "VOCALTEC introduces the internet phone telephony gateway linking traditional and internet telephone networks," VocalTec—The First and the Best, http://www.vocaltec.com/html/news1996/press_03_08.html, 3 pages, Aug. 7, 2001.

Unknown Author, Press Release, "VOCALTEC's telephony gateway software captures 1996 product of the year honors from Computer Telephony magazine," VocalTec—The First and the Best, http://www.vocaltec.com/html/news1996/press_12_18.html, 3 pages, Aug. 7, 2001.

V.C. Majeti, "A Network Management Model for ADSL-based Broadband Systems," ADSL Forum Network Management Group, Brussels, Belgium, ADSL-Forum 97-112, 4 pages, Sep. 15, 1997.

V.C. Majeti, "A Network Management Systems (NMS) Operations for ADSL-based Broadband Systems," ADSL Forum Network Management Group, Brussels, Belgium, ADSL Forum 97-113, 4 pages, Sep. 15, 1997.

Unknown Author, "Network Migration Working Text," ADSL Forum WT-013, ADSLForum WT013, Draft D, 60 pages, Jul. 8, 1997.

Unknown Author, "Network Migration Working Text," ADSL Forum WT-013, ADSLForum WT013, Draft C, 55 pages, Apr. 18, 1997.

Unknown Author, "Network Migration Working Text," ADSL Forum WT-013, ADSLForum WT013, Draft B, 53 pages, Jan. 12, 1997.

Unknown Author, "Network Migration Working Text," ADSL Forum WT-00x, ADSLForum 96-116, 32 pages, Dec. 10, 1996.

Unknown Author, "A Discussion of Voice over Frame Delay," Voice over FR, http://www.frforum.com/4000/4017052699.html, 10 pages, Aug. 7, 2001.

M. Coronaro, B. Rossi, "Integrated Office Communication System," Office Communication System, Electrical Communication—vol. 60, No. 1, 1986.

* cited by examiner

SYSTEM AND METHOD USING SWITCH FABRIC TO SUPPORT REDUNDANT NETWORK PORTS

TECHNICAL FIELD OF THE INVENTION

This invention relates generally to the field of telecommunications and, in particularly, to gateway systems for voice over broadband. More particularly, the present invention relates to a system and method for using switch fabric to support redundant network ports in a gateway system.

BACKGROUND OF THE INVENTION

Digital subscriber line (DSL) technology was initially deployed to provide data-only service as a replacement for slower-speed, dial-up modems. Incumbent local exchange carriers (ILECs), competitive local exchange carriers (CLECs), and other telecommunication providers have begun to explore offering voice-over-Digital Subscriber Line (VoDSL) service, and other voice-over-broadband services, to deliver integrated voice and data services.

A central component of a typical VoDSL system is the voice gateway, or simply "gateway." The gateway receives Voice over Internet Protocol (VoIP) or Voice over ATM (VoATM) information from the customer premises via network ports. The gateway then reformats the telecommunication information and sends it to a public switched telephone network (PSTN) via telecommunication ports. Likewise, telecommunication information from the PSTN is received at the telecommunication ports, packetized, and then transmitted to users via the ATM ports. Thus, the telephones, computers, and other telecommunication equipment at the customer premises are typically connected to the gateway via an ATM network, and the ATM ports in the gateway are wide area network (WAN) ports. The network ports typically reside on cards that plug in to the gateway. The network ports may, for example, connect to an ATM/IP network, a Digital Subscriber Line Access Multiplexor (DSLAM), or a Cable Modem Termination System (CMTS). Regarding specific techniques for encoding telecommunication information, there are several means available for carrying packetized voice over broadband, including the ATM Adaptation Layer Type 2 Broadband Loop Emulation Service (AAL2 BLES) protocol for carrying voice directly over ATM and the Voice over IP over ATM (VoIPoATM) protocol for transporting IP over ATM Adaptation Layer Type 5 (AAL5).

Gateways are now available with the capacity to process, bridge, and/or switch thousands of users. Network designers may also wish to oversubscribe the number of users based on statistical analysis of a network's behavior. In both cases, a large amount of user traffic passes through a typical gateway at any given time. Due to this large concentration of traffic, it is becoming increasingly important to maintain service, despite failure of components such as network ports.

One technique used to increase gateway reliability is to implement network port redundancy with automatic protection switching (APS). For conventional APS, the gateway is generally provided with at least one primary network port, known as the working port, and at least one redundant network port, known as the protection port. If the working port experiences a fault, the working port automatically passes the bearer traffic through to the protection port. Specifically, according to conventional APS, resources residing in the working port utilize a communication path that links the working port and the protection port to forward traffic received by the working port through to the protection port. Resources residing on the protection port receive the forwarded traffic and pass it through to the ATM network.

A disadvantage associated with this technique, however, is that additional resources must be provided on the network ports to support passing bearer traffic from the working port to the protection port. For example, the working port must include logic and hardware for detecting faults and forwarding traffic to the protection port. Thus, this method adds cost to the network ports. Furthermore, it may be necessary to remove the working port to cure the fault. However, removal of the working port will interrupt the bearer traffic that the working port passes through to the protection port unless additional steps are taken to otherwise reroute that traffic. There is therefore a need for improved protection-switching technologies that do not increase the cost of network ports and that allow working ports to be replaced easily without interrupting bearer traffic.

SUMMARY OF THE INVENTION

In accordance with the present invention, a system and method for supporting redundant network ports is provided that substantially eliminates or reduces disadvantages or problems associated with previously developed systems and methods. In a method according to the present invention for providing protection switching in a voice-over-broadband (VOB) gateway, egress traffic is multicast from a switch fabric to a working port and to a protection port. The working port forwards the egress traffic to a network in a working mode of operation, and the protection port forwards the egress traffic to the network in a protection mode of operation. Also, the working port forwards ingress traffic to the switch fabric in the working mode of operation, and the protection port forwards the ingress traffic to the switch fabric in the protection mode of operation. In one aspect, ingress traffic is forwarded from the protection port and not from the working port in the protection mode of operation. In another aspect, the working port and the protection port share protection status information, and the protection status information is used to select between the working mode of operation and the protection mode of operation.

A technical advantage of the present invention is the elimination of extra hardware and/or software on the working port and the protection port, which reduces the cost of the network ports. Another technical advantage is that faulty ports can be removed without interrupting a connection that has been rerouted to a protection port, which increases gateway reliability.

BRIEF DESCRIPTION OF THE DRAWINGS

Additional features, functions, and technical advantages will become apparent upon review of the following description, claims, and figures, in which:

DETAILED DESCRIPTION

Figure 1:
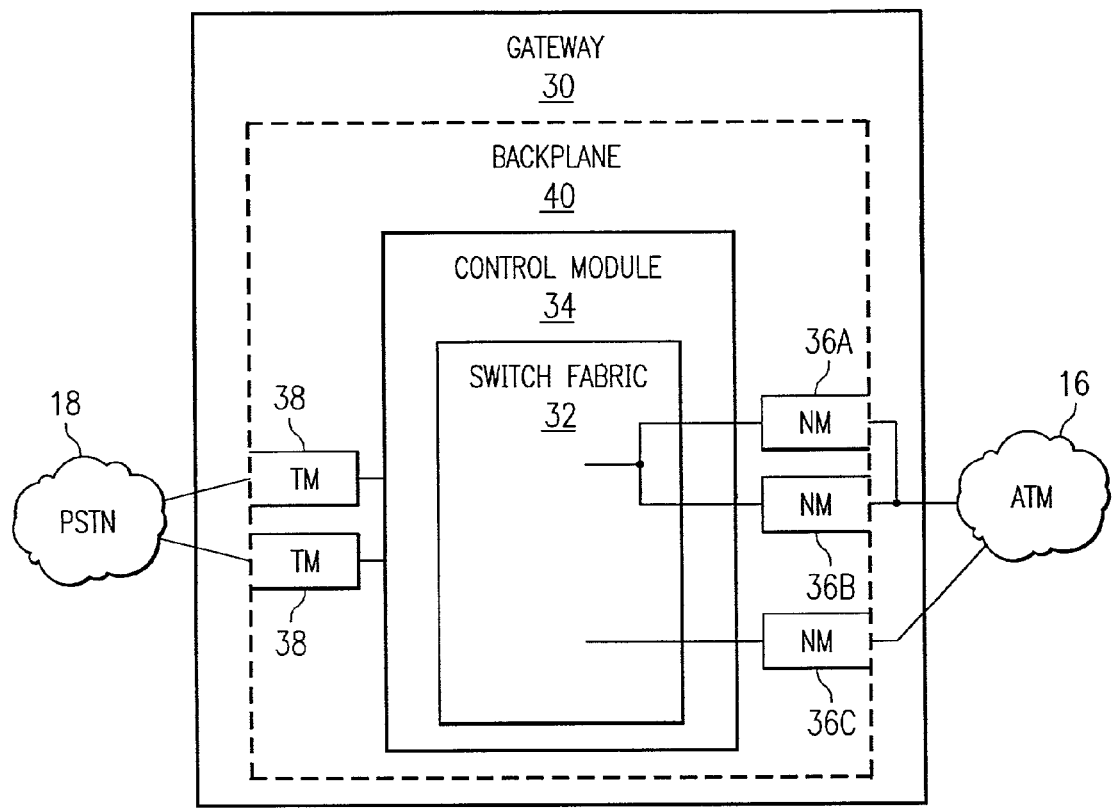
FIG. 1 presents a block diagram of an example embodiment of a gateway system with protection switching according to the present invention.

FIG. 1 depicts an example embodiment of a gateway 30 with protection switching according to the present invention. Gateway 30 includes one or more telephony modules 38 with telephony ports. Gateway 30 sends and receives traffic (i.e., telecommunication information) to and from a telecommunication system 18, such as a PSTN, via the telephony ports. The traffic on telecommunication system 18 may be referred to generally as voice data, and the telephony ports may send and receive the voice data in a time-division multiplexed (TDM) format, for example.

Gateway 30 also includes two or more network modules 36A–36C, each of which includes at least one network port. Gateway 30 sends and receives traffic to and from a network 16 via the network ports. For example, network 16 may be an IP or ATM network. In the example embodiment, the network port on network module 36A serves as a working port 46A and the network port on network module 36B serves as a protection port 46B, as described in greater detail below with reference to FIG. 2. A network port on network module 36C may serve as an active port with no associated protection port. The traffic on network 16 may be referred to generally as packets, even though networks other than ATM or IP networks may carry that traffic in alternative embodiments.

Also included in gateway 30 are a control module 34 and a backplane 40 that includes communication paths which interconnect network modules 36A–36C and control module 34. Additional communication paths in backplane 40 interconnect control module 34 with telephony modules 38. In the example embodiment, each telephony module 38, each control module 34, and each network module 36A–36C resides on a distinct adapter card.

Control module 34 reformats the voice data from telephony modules 38 into a format suitable for transmission on network 16 and reformats the packets from network modules 36A–36C into a format suitable for transmission on telecommunication system 18. For instance, in the example embodiment, control module 34 encapsulates the voice data into packets for transmission on network 16 and extracts voice data from packets received from network 16 for transmission on telecommunication system 18.

Control module 34 includes a switch fabric 32 that controls how traffic flows between telephony modules 38 and network modules 36A–36C. The traffic flowing from gateway 30 to network 16 is known as egress traffic, and the traffic that gateway 30 receives from network 16 is known as ingress traffic. In the example embodiment, switch fabric 32 is a high-capacity switch fabric 32 capable of IP and/or ATM multicast, and gateway 30 utilizes the multicast functionality to provide protection switching without adding extra components, and hence cost, to the system.

Figure 2:
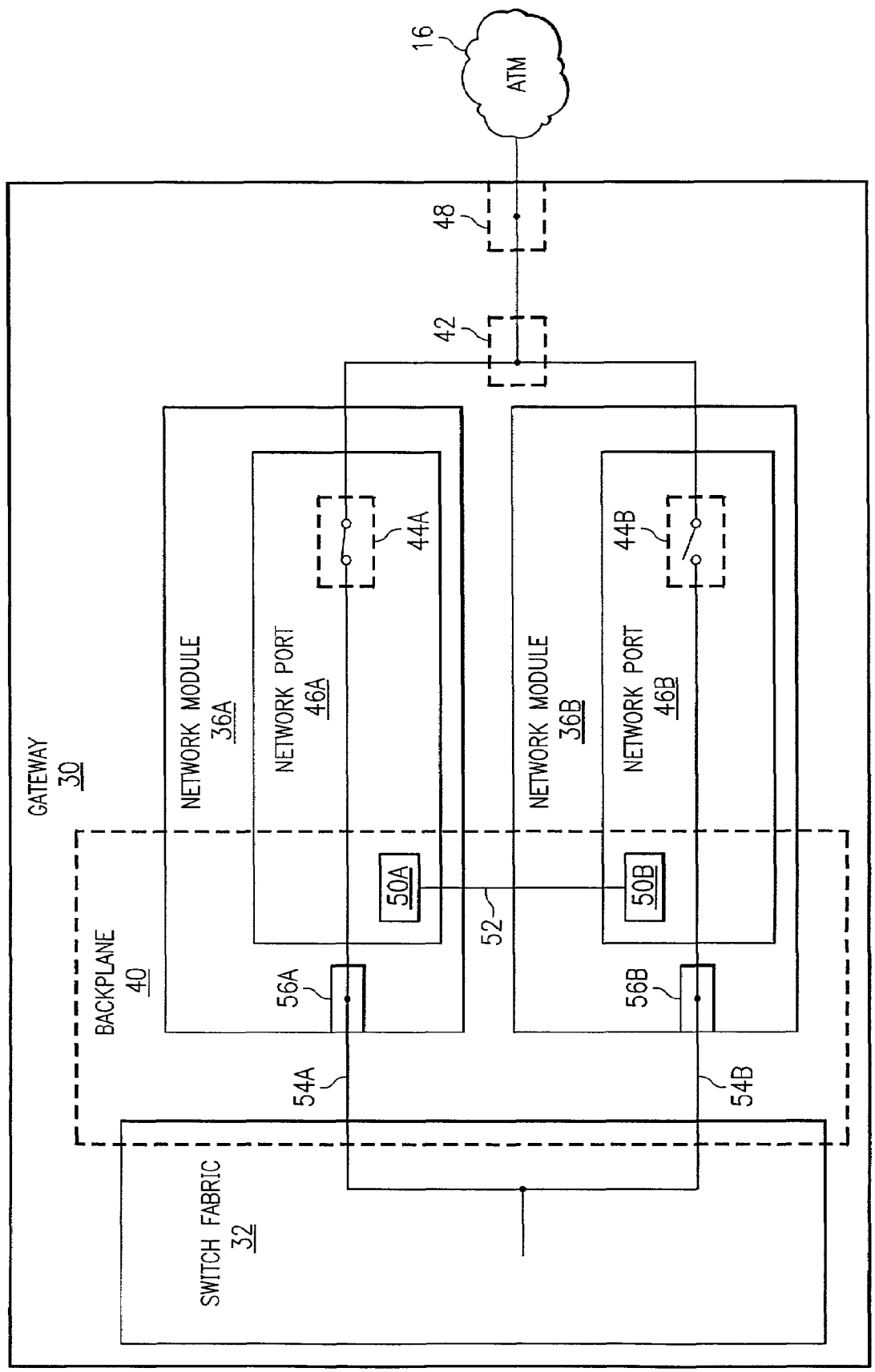
FIG. 2 presents a more detailed block diagram of portions of the gateway system of FIG. 1.

Referring now to FIG. 2, certain portions of gateway 30 are shown in greater detail. For instance, FIG. 2 shows that backplane 40 includes separate data paths 54A and 54B for switch fabric 32 to communicate with network modules 36A and 36B respectively. Also, network module 36A includes a data interface 56A, and network module 36B includes a data interface 56B. Data path 54A carries telecommunication information between switch fabric 32 and network module 36A via data interface 56A, and data path 54B carries telecommunication information between switch fabric 32 and network module 36B via data interface 56B.

Also, network ports 46A and 46B are shown residing on network modules 36A and 36B, respectively. Network ports 46A and 46B are also referred to as working port 46A and protection port 46B, respectively. For ingress traffic as well as egress traffic, both working port 46A and protection port 46B maintain a copy of the same connection tables. For egress traffic, switch fabric 32 simply multicasts traffic to both working port 46A and protection port 46B. Consequently, in the case of a fault on the working port, no new bearer connections to re-route traffic to protection port 46B are necessary. All traffic entering the switch fabric is simply copied to both ports 46A and 46B.

As FIG. 2 also indicates, network ports 46A and 46B include status ports 50A and 50B, respectively. Status ports 50A and 50B communicate status information between network ports 46A and 46B via a status path 52. Status ports 50A and 50B may also be referred to as status interfaces 50A and 50B. Network ports 46A and 46B also include protection switches 44A and 44B, respectively. In operation, network ports 46A and 46B provide protection switching by opening or closing respective protection switches 44A and 44B, based on the status information, as described below with reference to the flowchart of FIG. 3, which depicts an example process for providing protection switching in gateway 30.

Figure 3:
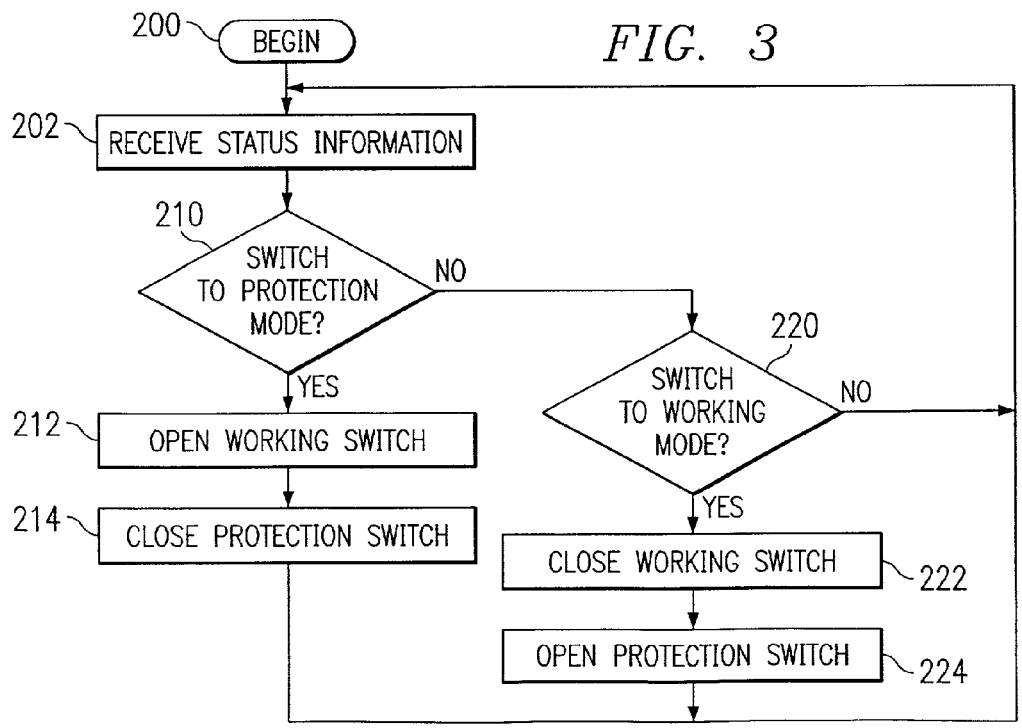
FIG. 3 presents a flowchart of an exemplary process for providing protection switching in a voice gateway according to the present invention.

The process of FIG. 3 begins at block 200 with network ports 46A and 46B operating in working mode and monitoring network communications to evaluate line conditions such as loss of signal, bit error rates (BERs), etc. Network ports 46A and 46B also monitor for internal failure conditions. In working mode, switching fabric 32 multicasts egress traffic for network port 46A to network module 36A via data path 54A and to network module 36B via data path 54B. Further, in working mode, network port 46A keeps protection switch 44A closed, and network port 46B keeps protection switch 44B open. Consequently, the traffic passes between network 16 and switch fabric via working port 46A but not via protection port 46B.

As indicated at block 202, network ports 46A and 46B then use status ports 50A and 50B and status path 52 to share status information reflecting the results of the monitoring. As depicted at block 210, network ports 46A and 46B then determine whether to switch from working mode to protection mode, based one the status information. For example, gateway 30 may use the Bellcore GR-253-CORE SONET (Synchronous Optical Network) standard for network communications, and network ports 46A and 46B may determine which mode should be used (i.e., working or protection), in accordance with that standard. For instance, network ports 46A and 46B may share bearer and APS status signals, such as loss of service (LOS), signal fail (SF), and signal degrade (SD). Nevertheless, although status signals may be passed between status ports 50A and 50B, the telecommunication information is not passed between status ports 50A and 50B but is instead sent and received directly to and from switch fabric 32 via data paths 54A and 54B.

If it is determined to switch to protection mode, working port 46A opens protection switch 44A and protection port 46B closes protection switch 44B, as depicted at blocks 212 and 214. Consequently, in protection mode, only protection port 46B carries the ingress traffic and egress traffic between network 16 and switch fabric 32. The process then returns to block 202, with network ports 46A and 46B monitoring conditions and sharing status information as described above.

However, the determination depicted at block 210 whether to switch to protection mode may be negative. For example, communications may be flowing in a satisfactory manner through working port 46A, or gateway 30 may already be operating in protection mode. If the determination at block 210 is negative, it is determined whether to revert to working mode, as indicated at block 220. If the current mode is protection mode and it is determined to revert to working mode, working port 46A closes protection switch 44A and protection port 46B opens protection switch 44B, as depicted at blocks 222 and 224. Switch fabric 32 consequently communicates ingress traffic and egress traffic with network 16 only via working port 46A. The process then returns to block 202. Network ports 46A and 46B then continue to monitor conditions and share status information, and gateway 30 continues to provide protection switching in response to changing conditions, as described above.

Thus, in working mode, ingress and egress traffic passes between network 16 and switching fabric 32 through components including working port 46A, protection switch 44A, data interface 56A, and data path 54A. In protection mode, by contrast, ingress and egress traffic passes between network 16 and switching fabric 32 through components including protection port 46B, protection switch 44B, data interface 56B, and data path 54B. Ingress and egress traffic may pass between network ports 46A and 46B and network 16 via a Y cable that includes a junction 42 and a network connector 48. The example embodiment thus provides automatic equipment protection for working port 46A. By filtering ingress traffic before it reaches switch fabric 32, network ports 46A and 46B prevent traffic sequencing errors that might otherwise result because the ingress traffic is routed to the same output port.

In an alternative embodiment, independent working and protection lines exist back to network 16. That is, the working and protection ports have independent connections or lines to network 16, and the egress traffic is not affected by protection switches 44A and 44B. However, the ingress traffic is still filtered at least on the inactive port (e.g., by switches like protection switches 44A and 44B) to avoid sequencing errors at switch fabric 32. Such an alternative embodiment may therefore provide line and equipment protection, in accordance with protection standards such as 1+1 SONET APS.

Among the advantages of the above embodiments is that they make more effective use of the bandwidth between the switch fabric and the network ports, rather than requiring bandwidth for telecommunication information between the working port and the protection port. In addition, since multicast is used for egress traffic, the software or other control logic for the gateway does not need to provision any new bearer connections to re-route traffic to the protection port. Further, the embodiments allow for component cost savings, since no components for bridging traffic between network ports are required. Also, in the described embodiments, faulty ports can be replaced without interrupting traffic flow between the switching fabric and the network. For example, when a gateway is in protection mode, a new working port may be swapped for a defective working port without interrupting traffic flow between the switch fabric and the protection port.

Although an example embodiment of the present invention has been described, myriad changes and variations may be made and used without departing from the scope and spirit of this invention. For example, although the discussion above refers to VoDSL service, alternative embodiments of the invention provide the functionality and advantages described above for gateways that utilize other types of broadband connections. Products that may benefit from the invention include, without limitation, DSLAMs, ATM switches, Routers, Voice Gateways, CMTSs, high-capacity packet transport products, and SONET Add-Drop Multiplexors. Likewise, it should be understood that the number of network modules, telephony modules, and control modules can be varied from that depicted in the example embodiment according to the needs of a particular implementation.

In addition, the example embodiment depicts the working and protection ports as physically residing on separate cards that are each connected to a backplane of a chassis that also houses the control module. In an alternative embodiment, however, the working and protection ports may reside on the same card. Nevertheless, in that alternative embodiment, the switch fabric would still use a first communication path of the backplane to send the telecommunication information to the working port and a second communication path of the backplane to send the telecommunication information to the protection port.

Furthermore, in the illustrated embodiment, the modules and components depicted within the gateway represent functional elements that are reasonably self-contained so that each can be designed, constructed, and updated substantially independently of the others. In a particular embodiment, some or all of those modules and components are implemented on one or more separate printed circuit boards or cards that may be coupled to a backplane in chassis. However, in alternative embodiments, the gateway may include different hardware, software, or combinations of hardware and software for providing the functionality described and illustrated in this application. The invention is therefore not to be limited to the example embodiment, but is to be defined by the following claims.

What is claimed is:

1. A method for providing protection switching in a voice-over-broadband (VOB) gateway, the method comprising:
   multicasting egress traffic from a switch fabric to a working port and to a protection port;
   forwarding the egress traffic from the working port to a network in a working mode of operation;
   forwarding the egress traffic from the protection port to the network in a protection mode of operation;
   forwarding ingress traffic from a network connector to the working port and to the protection port;
   forwarding the ingress traffic from the working port to the switch fabric in the working mode of operation, wherein only the working port forwards the ingress traffic in the working mode of operation;
   forwarding the ingress traffic from the protection port to the switch fabric in the protection mode of operation, wherein only the protection port forwards the ingress traffic in the protection mode of operation;
   sharing status information between the working port and the protection port; and
   selecting between the working mode of operation and the protection mode of operation, based on the status information
   wherein forwarding the ingress traffic from the protection port comprises forwarding the ingress traffic from the protection port directly to a control module of the VOB gateway via a backplane of the VOB gateway.

2. A method for providing protection switching in a voice-over-broadband (VOB) gateway, the method comprising:
   multicasting egress traffic from a switch fabric to a working port and to a protection port;
   forwarding the egress traffic from the working port to a network in a working mode of operation;

forwarding the egress traffic from the protection port to the network in a protection mode of operation;
forwarding ingress traffic from a network connector to the working port and to the protection port;
forwarding the ingress traffic from the working port to the switch fabric in the working mode of operation, wherein only the working port forwards the ingress traffic in the working mode of operation;
forwarding the ingress traffic from the protection port to the switch fabric in the protection mode of operation, wherein only the protection port forwards the ingress traffic in the protection mode of operation;
sharing status information between the working port and the protection port; and
selecting between the working mode of operation and the protection mode of operation, based on the status information
wherein multicasting egress traffic from a switch fabric to a working port and to a protection port comprises:
  transmitting the egress traffic from the switch fabric to the working port via a first communication path in a backplane of the VOB gateway; and
  transmitting the egress traffic from the switch fabric to the protection port via a second communication path in the backplane of the VOB gateway.

3. A method for providing protection switching in a voice-over-broadband (VOB) gateway, the method comprising:
multicasting egress traffic from a switch fabric to a working port and to a protection port;
forwarding the egress traffic from the working port to a network in a working mode of operation;
forwarding the egress traffic from the protection port to the network in a protection mode of operation;
forwarding ingress traffic from a network connector to the working port and to the protection port;
forwarding the ingress traffic from the working port to the switch fabric in the working mode of operation, wherein only the working port forwards the ingress traffic in the working mode of operation;
forwarding the ingress traffic from the protection port to the switch fabric in the protection mode of operation, wherein only the protection port forwards the ingress traffic in the protection mode of operation;
sharing status information between the working port and the protection port; and
selecting between the working mode of operation and the protection mode of operation, based on the status information
selecting the protection mode of operation by:
  opening a switch between a first communication path in a backplane of the VOB gateway and the network; and
  closing a switch between a second communication path in a backplane of the VOB gateway and the network.

4. A method for providing protection switching in a voice-over-broadband (VOB) gateway, the method comprising:
multicasting egress traffic from a switch fabric to a working port and to a protection port;
forwarding the egress traffic from the working port to a network in a working mode of operation;
forwarding the egress traffic from the protection port to the network in a protection mode of operation;
forwarding ingress traffic from a network connector to the working port and to the protection port;
forwarding the ingress traffic from the working port to the switch fabric in the working mode of operation; and
forwarding the ingress traffic from the protection port to the switch fabric in the protection mode of operation;
sharing status information between the working port and the protection port; and
selecting between the working mode of operation and the protection mode of operation, based on the status information.

5. A method for providing protection switching in a voice-over-broadband (VOB) gateway, the gateway having a backplane and first and second network modules, the backplane having a first communication path in communication with the first network module and a second communication path in communication with the second network module, the method comprising:
at the first network module, receiving egress traffic directly from a switch fabric of the VOB gateway via the first communication path of the backplane;
at the second network module, receiving egress traffic directly from the switch fabric via the second communication path of the backplane;
receiving ingress traffic from a network at a network connector;
forwarding the ingress traffic from the network connector to the first network module and at the second network module;
in a working mode of operation, only the first network module forwards the ingress traffic directly to the switch fabric via the first communication path of the backplane;
in a protection mode of operation, only the second network module forwards the ingress traffic directly to the switch fabric via the second communication path of the backplane;
receiving status information at the protection port of the second network module from a working port of the first network module; and
selecting between the working mode of operation and the protection mode of operation for the protection port, based on the status information.

6. A method for providing protection switching in a voice-over-broadband (VOB) gateway, the gateway having a backplane and first and second network modules, the backplane having a first communication path in communication with the first network module and a second communication path in communication with the second network module, the method comprising:
at the first network module, receiving egress traffic directly from a switch fabric of the VOB gateway via the first communication path of the backplane;
at the second network module, receiving egress traffic directly from the switch fabric via the second communication path of the backplane;
receiving ingress traffic from a network at a network connector;
forwarding the ingress traffic from the network connector to the first network module and at the second network module;
in a working mode of operation, forwarding the ingress traffic from the first network module directly to the switch fabric via the first communication path of the backplane; and
in a protection mode of operation, forwarding the ingress traffic from the second network module directly to the switch fabric via the second communication path of the backplane;

wherein the VOB gateway comprises an adapter card that includes the second network module, and the second network module includes a protection port, the method further comprising:
receiving status information at the protection port; and
selecting between the working mode of operation and the protection mode of operation for the protection port, based on the status information;
wherein the operation of receiving status information at the protection port comprises receiving the status information from a second adapter card of the VOB gateway.

7. A gateway that provides protection switching for voice-over-broadband (VOB) service, the gateway comprising:
a network connector in communication with a network;
a working port in communication with the network connector;
a protection port in communication with the network connector;
a switch fabric in communication with the working port and the protection port, wherein:
the switch fabric multicasts egress traffic to the working port and to the protection port;
in a working mode of operation, only the working port forwards the egress traffic from the switch fabric to the network connector and forwards ingress traffic from the network connector to the switch fabric;
in a protection mode of operation, only the protection port forwards the egress traffic from the switch fabric to the network connector and forwards the ingress traffic from the network connector to the switch fabric; and
the network connector forwards the egress traffic to the network and forwards the ingress traffic to the working port and to the protection port;
a status interface that shares status information between the working port and the protection port, wherein a selection between the working mode of operation and the protection mode of operation is based on the status information
a control module that includes the switching fabric; and
a backplane in communication with the control module and the protection port, wherein the backplane carries the ingress traffic from the protection port directly to the control module.

8. The gateway of claim 7, wherein the working port does not forward the ingress traffic to the switching fabric in the protection mode of operation.

9. A gateway that provides protection switching for voice-over-broadband (VOB) service, the gateway comprising:
a network connector in communication with a network;
a working port in communication with the network connector;
a protection port in communication with the network connector;
a switch fabric in communication with the working port and the protection port, wherein:
the switch fabric multicasts egress traffic to the working port and to the protection port;
in a working mode of operation, only the working port forwards the egress traffic from the switch fabric to the network connector and forwards ingress traffic from the network connector to the switch fabric;
in a protection mode of operation, only the protection port forwards the egress traffic from the switch fabric to the network connector and forwards the ingress traffic from the network connector to the switch fabric; and
the network connector forwards the egress traffic to the network and forwards the ingress traffic to the working port and to the protection port;
a status interface that shares status information between the working port and the protection port, wherein a selection between the working mode of operation and the protection mode of operation is based on the status information; and
a backplane with a first communication path between the switch fabric and the working port and a second communication path between the switch fabric and the protection port, wherein the switching fabric transmits the egress traffic to the working port via the first communication path and transmits the egress traffic to the protection port via the second communication path.

10. The gateway of claim 9, further comprising:
a first switch on the working port; and
a second switch on the protection port, wherein:
the gateway keeps the first switch closed and the second switch open in the working mode of operation; and
the gateway keeps the first switch open and the second switch closed in the protection mode of operation.

11. A gateway that provides protection switching for voice-over-broadband (VOB) service, the gateway comprising:
a network connector in communication with a network;
a working port in communication with the network connector;
a protection port in communication with the network connector; and
a switch fabric in communication with the working port and the protection port, wherein:
the switch fabric multicasts egress traffic to the working port and to the protection port;
in a working mode of operation, the working port forwards the egress traffic from the switch fabric to the network connector and forwards ingress traffic from the network connector to the switch fabric;
in a protection mode of operation, the protection port forwards the egress traffic from the switch fabric to the network connector and forwards the ingress traffic from the network connector to the switch fabric; and
the network connector forwards the egress traffic to the network and forwards the ingress traffic to the working port and to the protection port;
a status path between the working port and the protection port, wherein:
the working port and the protection port share status information via the status path; and
the working port and the protection port select between the working mode of operation and the protection mode of operation, based on the status information.

12. An adapter card for providing protection switching in a voice-over-broadband (VOB) gateway having a switch fabric and a backplane with a communication path to the switch fabric, the adapter card comprising:
a data interface operable to communicate directly with a switch fabric of a VOB gateway via a communication path;
a protection port operable to communicate with a network and with the data interface;
a switch between the data interface and the network, wherein the switch is open in a working mode of operation to prevent ingress traffic from reaching the data interface and the switch is closed in a protection mode of operation to allow ingress traffic to reach the data interface; and a status interface that receives status information from a working port of the VOB gateway, wherein the adapter card selects between the working mode of operation and the protection mode of operation based on the status information.

13. The adapter card of claim 12, wherein the switch, when open, prevents egress traffic from reaching the network and prevents ingress traffic from reaching the switch fabric.

14. The adapter card of claim 12, further comprising:

the working port being operable to communicate with the network and with the data interface; and a second switch between the data interface and the network, wherein:

in the protection mode of operation, the second switch prevents the working port from forwarding the egress traffic to the network and prevents the working port from forwarding the ingress traffic to the data interface.

* * * * *